US009821910B1

(12) United States Patent
Suiter

(10) Patent No.: US 9,821,910 B1
(45) Date of Patent: Nov. 21, 2017

(54) UNMANNED VEHICLE CONTROL SYSTEM AND APPARATUS

(71) Applicant: Sean Patrick Suiter, Omaha, NE (US)

(72) Inventor: Sean Patrick Suiter, Omaha, NE (US)

(73) Assignee: uAvionix Corporation, Palo Alto, CA (US)

( * ) Notice: Subject to any disclaimer, the term of this patent is extended or adjusted under 35 U.S.C. 154(b) by 0 days.

(21) Appl. No.: 15/159,202

(22) Filed: May 19, 2016

Related U.S. Application Data

(60) Provisional application No. 62/163,750, filed on May 19, 2015, provisional application No. 62/170,043, filed on Jun. 2, 2015, provisional application No. 62/210,686, filed on Aug. 27, 2015.

(51) Int. Cl.
| | | |
|---|---|---|
| G01C 23/00 | (2006.01) | |
| B64C 39/02 | (2006.01) | |
| G08G 5/00 | (2006.01) | |
| G08G 5/04 | (2006.01) | |
| G01S 19/42 | (2010.01) | |

(52) U.S. Cl.
CPC ............ *B64C 39/024* (2013.01); *G01S 19/42* (2013.01); *G08G 5/0013* (2013.01); *G08G 5/0039* (2013.01); *G08G 5/045* (2013.01); *B64C 2201/024* (2013.01); *B64C 2201/145* (2013.01); *B64C 2201/146* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,438,475 A | * | 3/1984 | Haley | H02H 7/265 324/522 |
| 5,459,469 A | * | 10/1995 | Schuchman | G01S 13/765 342/32 |
| 5,933,098 A | * | 8/1999 | Haxton | B60R 25/1012 340/430 |
| 5,974,349 A | * | 10/1999 | Levine | B64F 5/00 340/945 |
| 6,148,179 A | * | 11/2000 | Wright | G08G 5/0013 340/531 |
| 6,167,238 A | * | 12/2000 | Wright | H04W 52/283 340/3.3 |

(Continued)

*Primary Examiner* — Jonathan L Sample
(74) *Attorney, Agent, or Firm* — Suiter Swantz pc llo

(57) ABSTRACT

A system for controlling an unmanned aerial vehicle may include a GNSS receiver, a transponder, one or more flight controls, a UAV operation module, a UAV mission module, and a UAV chassis. The system may include an operating area defined within an airspace and an airspace controller, and a transponder key issued to the UAV by the airspace controller. The airspace controller and the UAV may communicate to unlock UAV access of the operating area, including transmitting a transponder ID code for verification to the airspace controller; receiving a read certificate from the airspace controller; transmitting a mission plan to the airspace controller; receiving a mission key from the airspace controller; verifying the mission key via read back transmission to the airspace controller; and receiving a mission plan from the airspace controller in the form of the transponder key, the mission plan unlocking access to the operating area.

20 Claims, 6 Drawing Sheets

(56) References Cited

U.S. PATENT DOCUMENTS

| | | | | |
|---|---|---|---|---|
| 6,181,990 B1* | 1/2001 | Grabowsky | B64D 47/00 | 342/33 |
| 6,353,779 B1* | 3/2002 | Simon | H04B 7/18506 | 244/1 R |
| 7,006,032 B2* | 2/2006 | King | G01S 3/023 | 342/29 |
| 7,061,401 B2* | 6/2006 | Voos | G08G 5/0013 | 340/961 |
| 7,489,992 B2* | 2/2009 | Valette | G07C 5/008 | 340/945 |
| 7,698,025 B1* | 4/2010 | Cornell | G01C 23/00 | 244/75.1 |
| 7,908,042 B2* | 3/2011 | Brinkley | G08G 5/0013 | 342/29 |
| 8,131,407 B1* | 3/2012 | Robinson | G01C 23/00 | 340/945 |
| 8,190,727 B2* | 5/2012 | Henkel | H04L 67/12 | 709/208 |
| 8,477,061 B1* | 7/2013 | Pedersen | G01S 13/9303 | 342/42 |
| 8,629,788 B1* | 1/2014 | Greenleaf | G08G 5/0091 | 244/116 |
| 9,047,762 B1* | 6/2015 | Neuville | G08G 5/0021 | |
| 9,253,753 B2* | 2/2016 | Rubin | H04W 72/005 | |
| 9,355,564 B1* | 5/2016 | Tyson | G08G 5/0008 | |
| 9,527,587 B2 | 12/2016 | Levien | | |
| 9,646,502 B1* | 5/2017 | Gentry | G08G 5/0039 | |
| 2003/0093187 A1* | 5/2003 | Walker | B64C 13/20 | 701/1 |
| 2004/0249519 A1* | 12/2004 | Frink | B64D 45/0015 | 701/3 |
| 2005/0156777 A1* | 7/2005 | King | G01S 3/023 | 342/29 |
| 2007/0018052 A1* | 1/2007 | Eriksson | G05D 1/0044 | 244/190 |
| 2007/0194171 A1* | 8/2007 | Diamandis | A63K 3/00 | 244/10 |
| 2009/0027232 A1* | 1/2009 | Lavielle | H04B 7/18506 | 340/971 |
| 2009/0152391 A1* | 6/2009 | McWhirk | B64B 1/02 | 244/30 |
| 2010/0057899 A1* | 3/2010 | Henkel | H04L 67/12 | 709/223 |
| 2010/0085236 A1* | 4/2010 | Franceschini | G01S 13/765 | 342/30 |
| 2010/0095084 A1* | 4/2010 | Manning | G06F 12/0246 | 711/206 |
| 2010/0109865 A1* | 5/2010 | Armstrong | G08B 21/22 | 340/539.13 |
| 2011/0215922 A1* | 9/2011 | Armstrong | G08B 1/08 | 340/539.13 |
| 2011/0298618 A1* | 12/2011 | Stahl | H04M 1/72519 | 340/573.1 |
| 2012/0143482 A1* | 6/2012 | Goossen | G08G 5/0069 | 701/120 |
| 2012/0177198 A1* | 7/2012 | Cabos | H04L 9/0825 | 380/270 |
| 2012/0191273 A1* | 7/2012 | Jacobs | H04B 7/18508 | 701/3 |
| 2012/0221175 A1* | 8/2012 | Spinelli | G01S 19/01 | 701/2 |
| 2013/0197721 A1* | 8/2013 | Gu | B64D 45/00 | 701/3 |
| 2013/0242864 A1* | 9/2013 | Vermande | H04W 40/20 | 370/328 |
| 2014/0152507 A1* | 6/2014 | McAllister | G06K 7/10376 | 342/126 |
| 2014/0197980 A1* | 7/2014 | Schulte | G01S 13/91 | 342/37 |
| 2014/0210648 A1* | 7/2014 | Samuthirapandian | G08G 5/0008 | 340/961 |
| 2014/0222248 A1* | 8/2014 | Levien | B64C 39/024 | 701/2 |
| 2014/0249693 A1* | 9/2014 | Stark | B64C 39/024 | 701/2 |
| 2014/0257692 A1* | 9/2014 | Stefani | G01C 21/00 | 701/519 |
| 2014/0304107 A1* | 10/2014 | McAllister | G06Q 10/087 | 705/26.7 |
| 2014/0327564 A1* | 11/2014 | Sampigethaya | H04L 9/3215 | 342/32 |
| 2015/0077270 A1* | 3/2015 | Rubin | G08G 9/02 | 340/903 |
| 2015/0081201 A1* | 3/2015 | Rubin | G08G 9/02 | 701/301 |
| 2015/0170524 A1* | 6/2015 | Stefani | G08G 5/0013 | 701/120 |
| 2015/0296500 A1* | 10/2015 | Kanovsky | H04W 72/048 | 455/512 |
| 2015/0344149 A1* | 12/2015 | Mumaw | G05B 23/0251 | 701/33.4 |
| 2016/0027310 A1* | 1/2016 | Samuthirapandian | G08G 5/0021 | 345/418 |
| 2016/0117931 A1* | 4/2016 | Chan | G08G 5/0043 | 701/120 |
| 2016/0244187 A1* | 8/2016 | Byers | B64C 39/024 | |
| 2016/0284222 A1* | 9/2016 | Nicholls | G01S 1/045 | |

* cited by examiner

UNMANNED VEHICLE CONTROL SYSTEM AND APPARATUS

CROSS-REFERENCE TO RELATED APPLICATIONS

This application claims priority under 35 U.S.C. §119(e) to provisional U.S. Patent Application Ser. No. 62/163,750, filed on May 19, 2015; Ser. No. 62/170,043, filed on Jun. 2, 2015; and Ser. No. 62/210,686, filed on Aug. 27, 2015. Said provisional U.S. Patent Applications 62/163,750, 62/170,043, and 62/210,686, are herein incorporated by reference in their entirety.

TECHNICAL FIELD

The present invention generally relates to controlling an unmanned aerial vehicle and is further directed to a system for providing an unmanned aerial vehicle access to an operating area.

BACKGROUND

As the demand for unmanned aerial vehicle (UAV, also drone and UAS, hereinafter UAS) technology to be used in autonomous or semi-autonomous situations continues to rise, more efficient processes for operating UASs will be desired. Current prior art is largely lacking in true autonomous flight, requiring a UAV controller to continually communicate with an airspace controller such as an air traffic controller (ATC). This need for micro-managing greatly hinders the possibility of a fully autonomous UAS, especially in industrial scenarios such as package delivery and entertainment scenarios such as "eye-in-the-sky" multimedia recording (i.e. cameras at open-air sports stadiums). Further, even with the UAV controller continually on call to transmit and receive information from the airspace controller, it would still be possible for a delay in time to pass before either party knows the UAV has entering a restricted or prohibited operating area.

Instead, it would be beneficial for there to be a system where the UAV is able to determine, receive clearance, and alter its flight plan autonomously through autonomous or semi-autonomous communication with an airspace controller. The system should function as a "handshake system," where back-and-forth communication between a UAV and an airspace controller occurs over multiple steps to ensure the correct flight path and operating areas are utilized while flights paths and operating areas that may be restricted or prohibited are avoided. Additionally, the airspace controller should be able to initiate additional communication to alter the autonomous UAS's flight plan in response to an operating area classification change, and the UAV should be able to respond accordingly.

It would further be desirable for the handshake system to be able to alter the possible use of the UAV as necessary to protect high value assets ("HVAs"), unknown restricted or prohibited operating areas, and newly-created restricted or prohibited operating areas.

Currently manned aircraft implement a number of communication and traffic collision avoidance system ("TCAS") technologies, including RADAR, Mode 1-5, Mode A, Mode C, Mode S, ADS-B, and other transponder code formats. The autonomous handshake system should be able to integrate with at least one of these systems. In particular, the ADS-B (Automatic Dependent Surveillance-Broadcast) system is an automatic system designed to be constantly transmitting information, receiving information, and updating internal position. Integrating the use of the ADS-B network into the handshake system should allow for a nearly instantaneous communication network by minimizing the delay between mission plan changes being transmitted to a UAV and the UAV responding to those mission plan changes. Further, integration into at least one of these systems would allow the technology to be implemented on UASs more quickly.

Therefore, it would be desirable to provide a system and method that cures the defects of the prior art by allowing a UAV to determine its operating area and flight path through communication with an airspace controller. It would also be desirable for the communication to occur over a series of steps to ensure the correct flight paths and operating areas are utilized and avoiding the restricted or prohibited operating areas. It would further be desirable to provide a system and method for a UAV to operate in a preauthorized manner, while providing vehicle path and operating area authorization/avoidance, clearance, and traffic and obstacle awareness. Further, it would also be desirable to provide a system and method that integrates into current and future-implemented ATC communication networks and satellite networks.

SUMMARY

In a first aspect, embodiments of the inventive concepts disclosed herein are directed to a system for controlling an unmanned aerial vehicle (UAV). The UAV may include a chassis having an airframe, a group of rotors driven by motors, the motors driven by a power source. The UAV may have an operations module including processors, memory, flight controls, and a clock. The UAV may have a position module including a GNSS receiver and a transponder. The UAV may be configured to operate within one or more operating areas of an airspace having a controller. The UAV may communicate with the airspace controller by transmitting an identification (ID) code via the transponder, for authentication by the airspace controller. The airspace controller may transmit a read certificate for verification by the UAV. The UAV may transmit a mission plan for clearance or approval by the airspace controller, which may respond to a cleared mission plan by transmitting to the UAV transponder keys associated with implementing the approved mission plan. The UAV may verify the transponder keys via readback transmission to the airspace controller, and implement the cleared mission plan via the verified transponder keys.

In a further aspect, embodiments of the inventive concepts disclosed herein are directed to a UAV configured to operate within one or more operating areas of an airspace having an airspace controller. The UAV may include a chassis having an airframe, a group of rotors driven by motors, the motors driven by a power source. The UAV may have an operations module including processors, memory, flight controls, and a clock. The UAV may have a position module including a GNSS receiver and a transponder. The UAV may be configured to operate within one or more operating areas of an airspace having a controller. The UAV may communicate with the airspace controller by transmitting an identification (ID) code via the transponder, for authentication by the airspace controller. The UAV may receive and verify a read certificate transmitted by the airspace controller upon authentication. The UAV may transmit, upon verification of the read certificate, a mission plan for clearance or approval by the airspace controller. The UAV may receive, in response to a cleared mission plan, transponder keys associated with implementing the approved mission plan. The UAV may verify the transponder keys via read-back transmission to the airspace controller, and implement the cleared mission plan via the verified transponder keys.

In a still further aspect, embodiments of the inventive concepts disclosed herein are directed to a method for controlling an unmanned aerial vehicle (UAV). The method may include transmitting, via a transponder of the UAV, a transponder identification (ID) code to an airspace controller. The method may include verifying, via the UAV, a read certificate received from the airspace controller. The method may include transmitting, via the transponder, a mission plan to the airspace controller. The method may include receiving, via the transponder, transponder keys associated with a cleared or approved mission plan from the airspace controller. The method may include verifying the transponder keys by transmitting, via the transponder, a read back transmission including the transponder keys to the airspace controller. The method may include implementing verified transponder keys via the UAV.

BRIEF DESCRIPTION OF THE FIGURES

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1A:
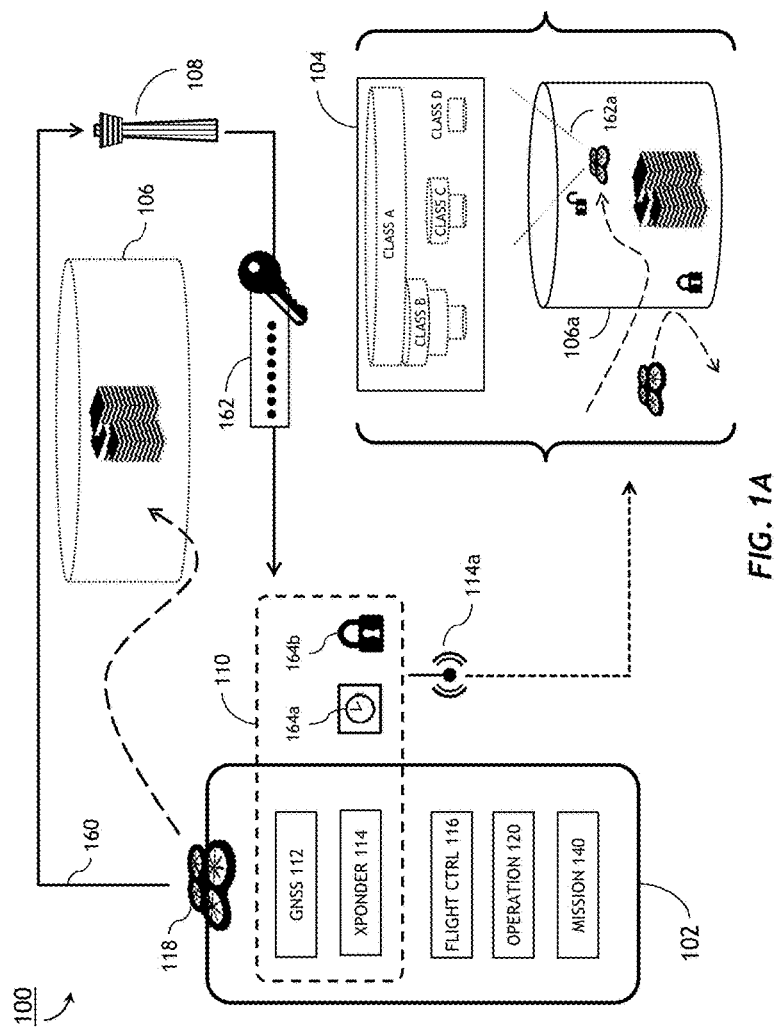
FIG. 1A illustrates an exemplary embodiment of a system for controlling an unmanned aerial vehicle (UAV) according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system for controlling one or more unmanned aerial vehicles (UAV). Each UAV, and an airspace controller, includes processors and a transponder for communicating with each other to determine, for example, whether the UAV is permitted to enter, traverse, or operate within an airspace administered by the airspace controller. For example, the UAV may transmit its transponder code to the airspace controller for authentication or verification and receive an acknowledgment. Upon transmitting its mission plan the airspace controller may review and clear the mission plan, issuing a transponder key or mission file to the UAV. The transponder key or mission file may define the terms of entry to, and operation within, the airspace; the transponder key may additionally unlock processes or components aboard the UAV toward fulfillment of the mission plan.

Figure 1B:
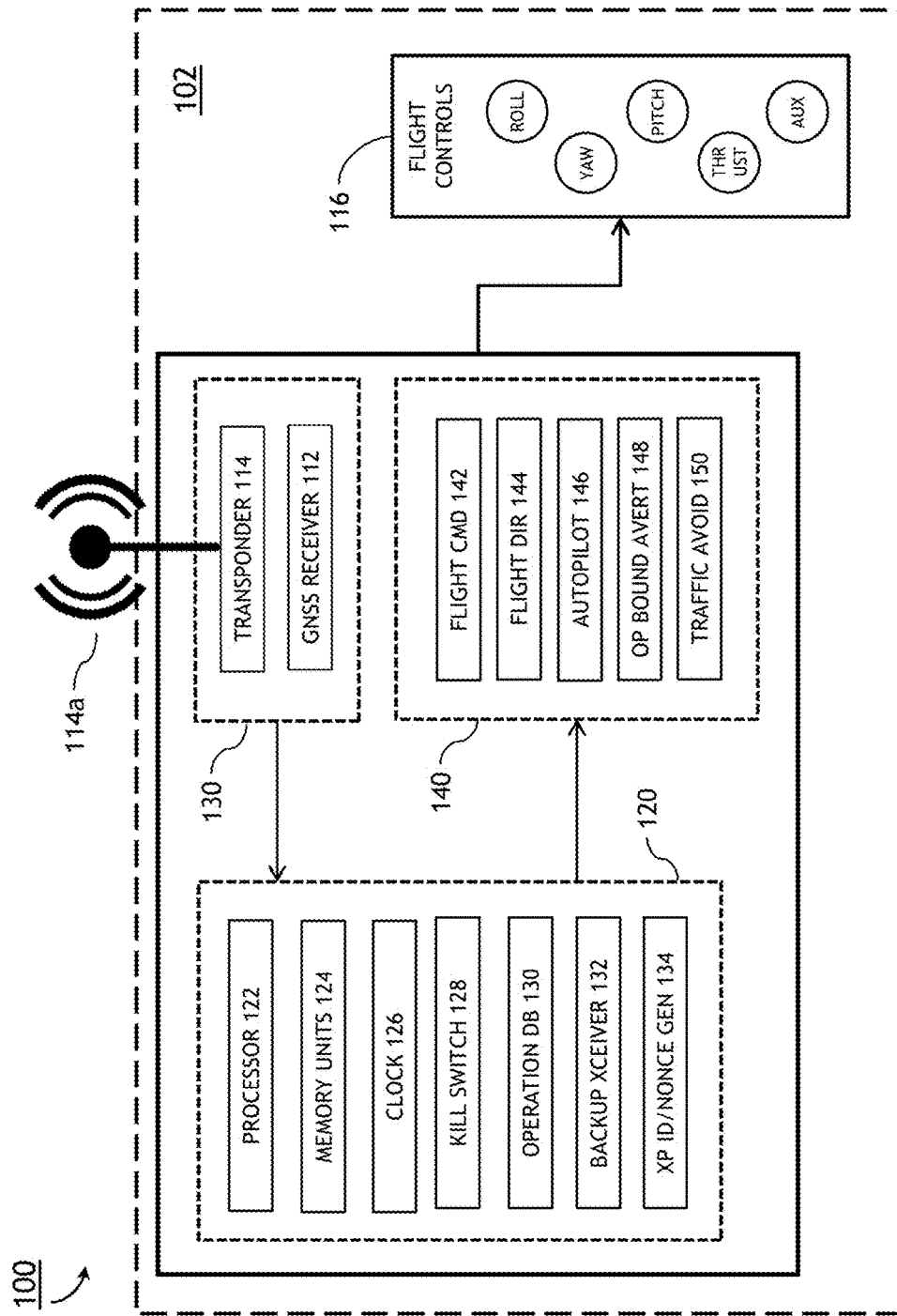
FIG. 1B illustrates components of the system of FIG. 1A.

Referring generally to FIGS. 1A and 1B, a system 100 for controlling an unmanned aerial vehicle (UAV) is shown, in accordance with one or more embodiments of the present disclosure. In one embodiment, as shown in FIG. 1A, a UAV 102 operates within an airspace 104. In another embodiment, the airspace 104 may be determined by any of the currently existing airspaces known in the art. For example, the airspace may be based on at least one of Classes A-G; Airport Radar Service Areas ("ARSA"); Military Operational Areas ("MOA"); Military Training Routes ("MTR"); Prohibited Areas; National Security Areas; Positive Control Areas; Restricted Areas; special use areas; Temporary Flight Restrictions ("TFRs"); jet routes; visual flight rules ("VFR")

corridors, flyways, and routes as described in 14 CFR parts 71 and 91; or similar airspace classification systems known in the art.

In another embodiment, the UAV 102 is in a particular operating area 106 within airspace 104. In another embodiment, the operating area 106 may be classified as unrestricted, restricted, or prohibited. For example, the operating area 106 may not restrict access to any UAV traffic. Alternatively, the operating area 106 may have at least one of a number of restrictions, including being unrestricted for some UAV traffic but prohibited for other UAV traffic; being restricted for at least a portion of UAV traffic at a certain time of day; being restricted for at least a portion of UAV traffic for a certain event or high value asset ("HVA"); or being restricted unless certain requirements or conditions are met (e.g., a classification may be dependent on more than one UAS). For example, what constitutes a "certain requirement" may include at least one of permission, a pre-approved plan, notice, restricted velocity, air speed, altitude, time of day, duration of flight, UAV volume, UAV mass, and the like. Alternatively still, the operating area 106 may be prohibited to all UAV traffic (i.e. classification is independent of all UASs).

In another embodiment, the classification of the operating area 106 is not static, and may be changed by the airspace controller 108 as a new situation arises, described in further detail herein.

In another embodiment, operating area 106 may be defined by a coordinate system comprising at least one set of coordinates. For example, the operating area may be a hemispheric region defined by a coordinate for the center of an operating area, a particular radius representing a whole hemisphere, and/or a chord/height. By way of another example, operating area 106 may be defined by an alpha, numeric, or alphanumeric designation with a corresponding operating area coordinate lookup table.

It is noted herein that the above examples regarding a hemispheric operating area 106 are not limiting and should be interpreted as merely illustrative of the types of materials that may be implemented within the context of the present invention. For example, the operating area 106 may be spherical, cylindrical, or cubic in shape, described in further detail herein.

In another embodiment, operating area 106 may be defined by existing defined locations. For example, operating area 106 may be implied and/or defined by at least one location code. For example, the at least one location code may be set based on at least one of ICAO, FAA, CLLI, GEOIDS, or similar airspace and telecommunication authority code systems known to the art.

In another embodiment, operating area 106 may be defined by at least one of clearance times or clearance void times. For example, the at least one clearance time or clearance void time may utilize or leverage SMPTE (BCD timecode) with a referenced time, or the similar timecode formats known in the art.

In one embodiment, the UAV 102 is equipped with the means for determining the position of the UAV, either on an absolute basis or relative to at least one operating area and/or one or more restricted areas, in a position module 110. In another embodiment, the position module 110 of UAV 102 includes a satellite-based transmission ("GNSS") receiver 112. For example, the GNSS receiver 112 may be a location sensor configured to operate at altitudes of up to 60,000 feet. In another embodiment, the GNSS receiver 112 may be configured to receive periodic signals from one or more geolocation/geonavigation satellites, including GPS, GLO-NASS, Compass, Galileo, or other like satellites or constellations thereof. In another embodiment, the location sensor is a Wide Area Augmentation System (WAAS) or a similar high-integrity GPS receiver certified for use in the Automatic Dependent Surveillance-Broadcast ("ADS-B") system, described in further detail herein.

In another embodiment, the position module 110 of UAV 102 includes a transponder 114. In another embodiment, the GNSS receiver 112 may determine and report the UAV 102 position to the transponder 114. For example, the GNSS receiver 112 may implement a lookup register or the like or a geospatial area defined by at least one set of coordinates. Additionally, at least two dimensions may be described by reference in a lookup register or as an operational area 106.

In one embodiment, the transponder 114 of the UAV 102 is designed to run on an Automatic Dependent Broadcast-Surveillance ("ADS-B") network. For example, the UAV 102 may be equipped with at least one ADS-B In and/or ADS-B Out compatible antenna (114a). Additionally, the ADS-B In and/or ADS-B Out antennae are used by the UAV 102 to broadcast and receive operational data. For example, UAV 102 may broadcast position and other relevant information to other area UAVs, other area operators, other area controlling authorities, other area vehicles, and other area aircraft.

Referring now to FIG. 1B, the system 100 for controlling an unmanned aerial vehicle is further shown, in accordance with one or more embodiments of the present disclosure. For example, FIG. 1B shows a more detailed view of the UAV 102 internal modules, processes, and components.

In one embodiment, the UAV 102 has a position module 110. For example, the position module 110 may comprise a GNSS receiver 112 and a transponder 114, as described previously herein. Additionally, the transponder 114 is designed to run on the ADS-B system.

In another embodiment, the UAV 102 has an operation module 120. For example, the operation module 120 may be comprised of one or more processors 122, one or more memory units 124, or a clock 126. Additionally, the operation module may include a kill switch 128, an operation database 130, a secondary or backup transceiver 132, or a transponder ID/nonce generator 134. For example, the operation module 120 may accept data from the GNSS receiver 112. Additionally, the operation module 120 may accept data received from third parties, including an airspace controller 108, through transponder 114.

It is noted herein that operation module 120 may comprise an onboard UAV control system. For example, the onboard UAV control system may incorporate and support any appropriate interface or platform for controlling unmanned aerial vehicle functions, such as DJI, 3DR, AirWare, MultiWii, AutoQuad/QGC, OpenPilot, PixHawk, or PrecisionHawk.

In another embodiment, the UAV 102 includes a mission module 140. For example, the mission module may be comprised of at least one a flight command generator module 142, a flight detector module 144, an autopilot module 146, an operation boundary averter module 148, and a traffic avoidance module 150.

In another embodiment, the UAV 102 is equipped with one or more flight controls 116. For example, the flight controls 116 may control at least one of the roll, pitch, yaw, and thrust of UAV 102, e.g., by controlling the rotational speed of one or more rotors of the UAV via the motors driving the rotors. In another embodiment, control commands are received from operation module 120. In another embodiment, control commands are received from mission module 140.

In another embodiment, the UAV 102 includes a chassis 118. For example, the chassis 118 may include at least one airframe. In another embodiment, the airframe of the UAV 102 may be coupled to one or more rotors, one or more motors coupled to the one or more rotors, and one or more power sources coupled to the one or more motors. It is noted that there exist additional components integral to the functioning of a UAV which are not listed herein. As such, the examples provided above should not be interpreted as limiting and are provided merely for illustration.

In another embodiment, all onboard UAV 102 electronic components are compatible with common drone voltages. For example, at least one of the components of position module 110, the components of operation module 120, the components of mission module 140, or the one or more flight controls 116 of the UAV 102 may be configured for 7.4V or 14.1V batteries commonly associated with UAV power supplies. For example, one power supply is required to power both the onboard UAV electronic components and the one or more motors. Alternatively, separate power supplies are required to power the onboard UAV electronic components and the one or more motors.

In an illustrative embodiment, the transponder 114 is linked to the one or more processors 122. For example, the transponder 114 may be linked to the one or more processors 122 via a Micro Air Vehicle Link (MAVLink) interface. By way of another example, the transponder 114 may have two MAVLink interfaces. By way of another example, the transponder 114 may have three or more MAVLink interfaces. By way of another example, the transponder 114 is linked to the one or more processors 122 via another communications protocol.

In another illustrative embodiment, the system 100 may include a controller (not shown) for the UAV 102. For example, the controller may be a portable computing device or a tablet. In another embodiment, the controller for the UAV 102 includes a control unit containing the necessary components to wirelessly control the functions of the UAV 102. For example, the control unit may include one or more processors. By way of another example, the at least one processor of the control unit is coupled to at least one receiver, at least one transmitter, and one or more memory units. In another embodiment, the controller may include a display, the display operably coupled to the one or more processors of the control unit. In another embodiment, the control of the UAV 102 may be wirelessly coupled to the one or more motors of the UAV 102, and configured to adjust the speed of the one or more rotors coupled to the one or more motors of the UAV 102.

In another embodiment, the UAV 102 may transmit at least one position or operational message to the controller for the UAV 102 through the MAVLink interface.

Referring again to FIG. 1A, in one embodiment an UAV operator (not shown) determines the UAV 102 control scheme for the operating area 106, including whether the UAV 102 will operate autonomously, semi-autonomously, controlled remotely by the operator, or controlled by the operator via line-of-sight operation. For example, the operator may desire to control the UAV 102 to fly through a currently restricted operating area 106. In an alternative embodiment, the operator may desire the UAV 102 to fly autonomously or semi-autonomously through a currently restricted operating area 106.

In another embodiment, the UAV 102 may transmit a flight plan request 160 setting forth, defining, or requesting access to one or more operating area 106 to the airspace controller 108. For example, the remote operator may file the flight plan request 160. Alternatively, the UAV 102 may be programmed to autonomously or semi-autonomously transmit the flight plan request 160. In another embodiment, the UAV 102 may transmit the flight plan request 160 as an interrogation. For example, the interrogation may include at any of modes 1-5, A, C, or S; ADS-B, or another transponder code format. It is noted that "flight plan" and "mission plan" are used interchangeably throughout the present disclosure.

In another embodiment, the flight path request 160 may contain accepted credentials, such as an identification (ID) code uniquely identifying the transponder 114 or the UAV 102, with which the UAV 102 will be allowed to enter the operating area 106 by the airspace controller 108. For example, the accepted credentials are contingent upon a number of factors including pre-granted access to certain operating areas 106, time of day, area traffic, and area high value assets ("HVA"). The ID code may uniquely identify the UAV 102 and may additionally indicate the position of the UAV or a current status (e.g., via an ADS-B message).

In another embodiment, if the transmitted flight plan request 160 does not contain acceptable credentials, the UAV 102 may not be allowed to enter the operating area 106 without a series of communications passing between the UAV 102 and the airspace controller 108. For example, the series of communications may ensure that the mission plan is feasible based on parameters including, but not limited to, operating area classification and area air traffic. In another embodiment, the series of communications functions as a "handshake system," described in further detail herein.

In another embodiment, without the completion of a required handshake system or identification authentication, the UAV 102 may consider the operating area 106 as surrounded by a barrier 106a created by a list of "no-fly" coordinates comprising a defined space around the operating area 106, effectively preventing the UAV 102 from entering the operating area.

In another embodiment, the transponder 114 may receive a transponder key 162 from the airspace controller 108 in response to the flight plan request 160 for a cleared operating area 106. For example, allowing the UAV 102 entry into the operating area 106 may include unlocking the UAV navigational system based on a specific flight path 164a for a specified amount of time 164b. Additionally, the transponder key 162 may be received as an alphanumeric code. In another embodiment, the transponder key 162 may only be issued by the airspace controller 108. In another embodiment, the transponder key 162 may only be usable by a designated, and authenticated, recipient UAV 102.

While the UAV 102 is implementing a cleared or approved flight plan, per any instructions or clearances included in the transponder key 162 received from the airspace controller 108, the UAV 102 may broadcast a second transponder key 162a via the transceiver 114 as an indication of the friendly or approved status of the UAV 102. The transponder key 162a may include the ID number or ID code of the UAV 102, information about the operating areas 106 in which the UAV has been authorized to operate, or other details relevant to the current mission plan. Any additional aircraft or airspace controllers 108 within range may listen for the transponder key 162a to verify that the presence of the UAV 102 in a given operating area 106 is non-hostile. If a UAV 102 is not broadcasting ap appropriate transponder key 162a while operating in a restricted operating area (secured by barrier 106a) airspace controllers 108 may interrogate the UAV or treat the UAV as hostile.

In one illustrative embodiment, a landlord or utility may want to fly a UAV 102 at or near windows of a structure or a set of structures so as to check for structure defects or needed repairs. Depending on the time of day, this UAV 102 activity could range from annoying, to disruptive, to invasive. However, the potential benefit of being able to use a UAV 102 to check the structure or set of structures may make such activity desirable enough that the airspace controller 108 may allow operating area 106 access to the UAV 102 during a particular time of day following completion of the handshake system.

In another illustrative embodiment, at least one newsgathering entity may seek to film an event occupied by a crowd in a confined area. Depending on the number of newsgathering entities requesting access, the airspace controller 108 may arbitrate between the requests to limit the number of, and the potentially invasive nature of, UAV 102 who can access the operating area 106 surrounding the event, through implementation of the handshake system.

In another illustrative embodiment, the at least one newsgathering entity may seek to film a breaking news story. Again, the airspace controller 108 may limit the number of newsgathering entities who may access the operating area 106 surrounding the breaking news story, through implementation of the handshake system. Alternatively, the airspace controller 108 may ground all UAV 102, should the breaking news story require sky access by emergency response personnel, through implementation of the handshake system and/or transmission of a transponder key.

In another illustrative embodiment, the airspace controller 108 may restrict or prohibit access to operating areas surrounding a high value asset ("HVA"), through implementation of the handshake system. For example, the HVA may be a group of individuals. The area surrounding the group of individuals (i.e., a public gathering) may qualify as a fixed HVA where no UAVs 102, or only selected and approved UAVs, may operate. Additionally, the HVA may be an individual. For example, an individual HVA may be fixed in space or in motion, rendering the corresponding operating area 106 dynamically defined relative to the movement of the HVA. By way of another example, the corresponding operating area 106 may dynamically update with the mobility of the HVA. By way of another example, the operating area 106 may increase or decrease in size, depending on the rank or importance of the HVA. In the case of a mobile HVA, the operating area 106 may be spherical, hemispherical, or cylindrical in shape. For example, the spherical operating area 106 may not be limited to the surface of the earth. Additionally, a spherical operating area 106 may include an altitude (dynamic or static) as one of the bounds defining the operating area 106. For example, a spherical operating area may follow the path of an airborne High Value Asset ("HVA") through space. An exemplary five mile operating area may follow an airborne HVA as the airborne HVA traverses a path through space.

Referring again to FIG. 1A, in one embodiment the classification of the operating area 106 may change. For example, a currently unrestricted operating area 106 may be changed to restricted or prohibited. For example, if an operating area 106 classification is changed to restricted, the airspace controller 108 may issue a replacement transponder key 162 withdrawing authority to access the operating area 106 to at least one UAV 102 or a class of UAV 102. By way of another example, if an operating area 106 classification is changed to prohibited, the airspace controller 108 may issue a replacement transponder key 162 withdrawing authority to access the operating area 106 to all UAV 102. It is noted that the group of "at least one UAV 102," "a class of UAV 102," and "all UAV 102" is used interchangeably with the "affected UAV 102."

In another embodiment, the replacement transponder key 162 may provide a number of alternate operating paths to the affected UAV 102, including at least one of removal of the affected UAV 102, having the affected UAV 102 return to its base, or grounding the affected UAV 102.

In another embodiment, the withdrawing of authority to access 106 by the airspace controller 108 may be completed without creating a hazard. For example, affected UAV 102 may be recalled or repelled safely in accordance with a preferred method transmitted by the affected UAV 102 as part of the flight path request 160. For example, any affected UAV 102 wishing to operate in an operational area must include a return to base, a pre-selected, and/or a pre-defined position in exchange for the requested transponder key 162. Additionally, the airspace controller 108 may issue a mass recall safely function. For example, should multiple affected UAV 102 be actively operating within an operating area 106 whose classification changes, each affected UAV 102 may be pre-cleared to a specific flight path upon activation of the mass recall safety function based on a hierarchical system. If one or more UAVs 102 are operating within, or proximate to, an operating area 106 reclassified as either restricted or prohibited to one or more of the UAVs, any individual or mass recall-safely function may be associated with one or more flight paths providing for deconflicted recall, e.g., preventing any UAV 102 from entering or traversing, pursuant to the recall function, an operating area 106 from which the UAV is currently restricted or prohibited.

In another embodiment, the issuing a replacement transponder key 162 to the affected UAV 102 within a classification-changed operating area 106 occurs without prior communication with the at least one affected UAV 102. In another embodiment, the issuing a replacement transponder key 162 to a UAV 102, a class of UAV 102, or all UAV 102 within an classification-changed operating area 106 occurs following the response to a request for a mission update communications, as described in further detail herein.

Figure 2:
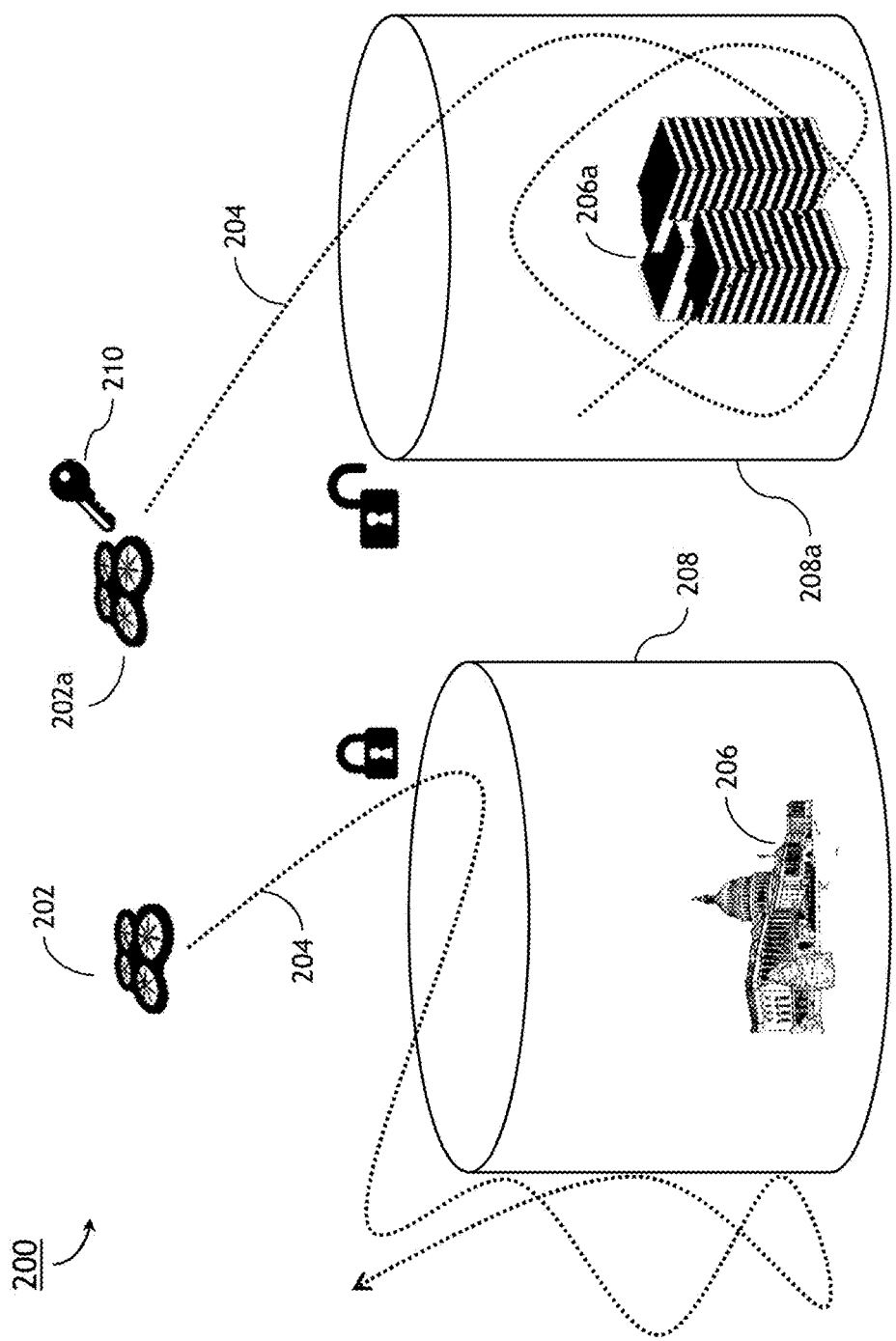
FIG. 2 illustrates an exemplary embodiment of an access operation of the system of FIG. 1A.

In another embodiment, the operating area 106 may be cylindrical or columnar in shape similar to a Temporary Flight Restriction (TFR) propagated by the airspace controller 108. Referring now to FIG. 2, an illustrative system 200 for controlling an unmanned aerial vehicle (UAV) is shown, in accordance with one or more embodiments of the present disclosure. It is noted herein that the various system embodiments, components and architecture described previously herein should be interpreted to extend to the system 200 of FIG. 2.

In one embodiment, a fixed structure HVA 206 may be surrounded by an operating area 208. In another embodiment, a UAV 202 has a flight plan 204 designed to make contact with, or operate proximate to, the fixed structure HVA 206. For example, if the UAV 202 does not receive a requested transponder key 210, and further does not receive an alternative flight path 204, the UAV 202 may be prevented from entering, scrammed from, or otherwise bounced around a "barrier" defined by the boundaries of the operating area 208 of the HVA 206, through implementation of the handshake system. Alternatively, if a UAV 202a does receive the requested transponder key 210, the UAV 202a will be able to access the operating area 208a of the HVA 206a, through implementation of the handshake system. For example, access may be pre-cleared or permit-based. By way of another example, access may be temporary and/or time-of-day sensitive.

In another embodiment, the HVA may be a scheduled event. In another embodiment, the HVA may be a spontaneously-occurring event. For example, the spontaneously-occurring HVA may result in a classification change of an operating area, which may subsequently require an alteration in UAV access, as discussed in further detail herein.

Figure 3:
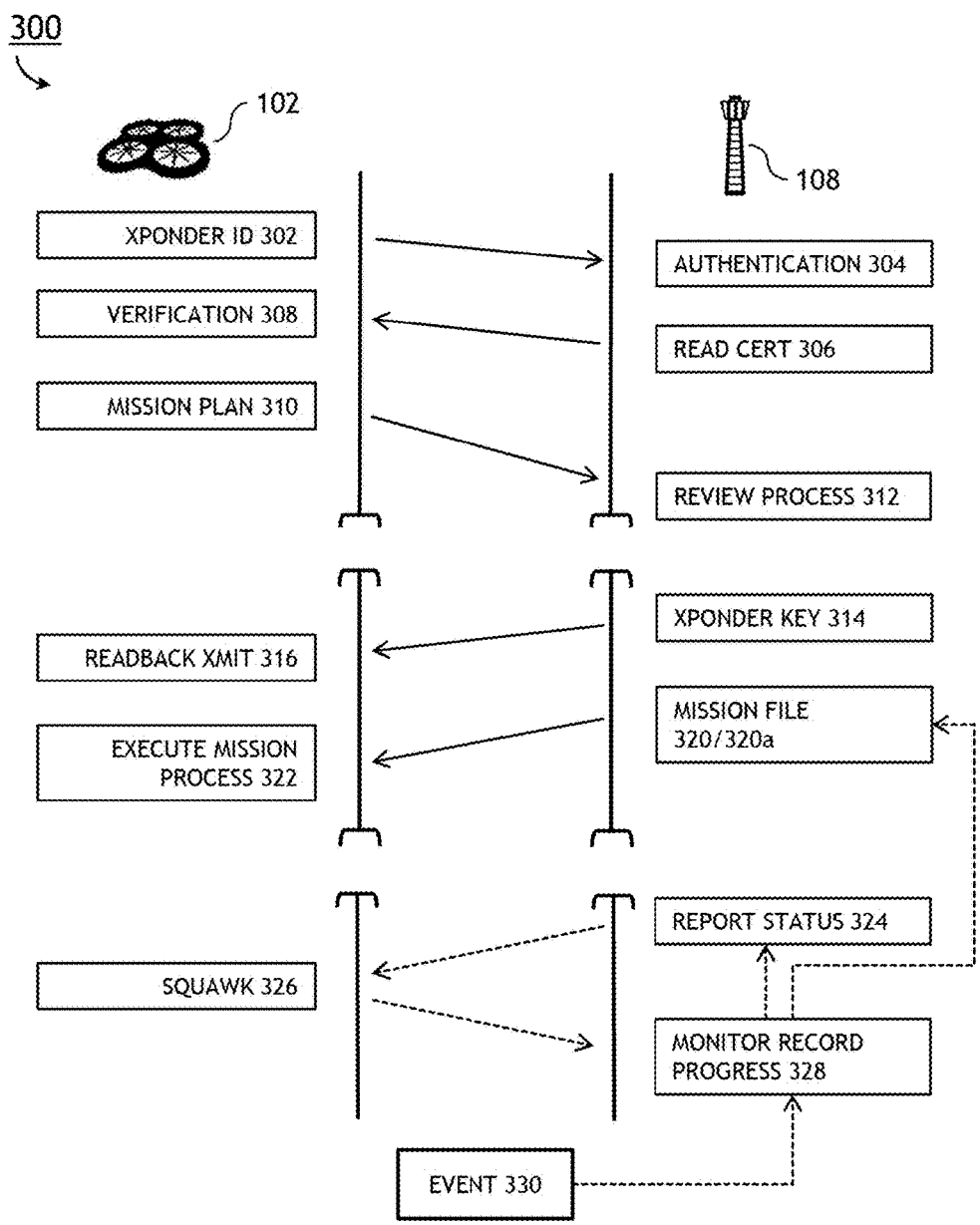
FIG. 3 illustrates an exemplary embodiment of a transmission operation of the system of FIG. 1A.

Referring now to FIG. 3, a system 300 for controlling an unmanned aerial vehicle is shown, in accordance with one or more embodiments of the present disclosure. It is noted herein that the various system embodiments, components and architecture described previously herein should be interpreted to extend to the system 300 of FIG. 3. For instance, the system 300 illustrates how an airspace controller 108 may at least one of integrate, authenticate, monitor, control, or provide services to a UAV 102 through an authentication protocol system, or a "handshake system." It is noted that the airspace controller 108 may be an air traffic controller ("ATC"). As such, the "airspace controller 108" and "ATC 108" will be used interchangeably throughout the present disclosure.

In one embodiment, the transponder 114 of the UAV 102 may transmit a transponder identification ("ID") code 302 to the ATC 108 for the ATC 108 to verify in an authentication process 304. In another embodiment, the ATC 108 may transmit a read certificate 306 or similar information for the UAV 102 to verify in a verification process 308. In another embodiment, the UAV 102 may transmit a read certificate 306 with the transponder ID code 302 to the ATC 108.

In another embodiment, the UAV 102 may transmit a mission plan 310 following the authentication process 304 and verification process 308. For instance, the mission plan 310 may outline at least one of a unique identifier of the UAV 102 (e.g., an N-number or equivalent), operator information, class and category information, a proposed operation area, a proposed mission purpose, a proposed mission start time and/or end time, or a current position of the UAV 102. It is noted herein that the mission plan 310 and the flight plan request 160 of FIG. 1A are used interchangeably throughout the present disclosure.

In another embodiment, upon receipt of the mission plan 310, the ATC 108 may review the mission plan 310 in a review process 312. For instance, the mission plan 310 may be cleared as proposed. Alternatively, the mission plan 310 may be cleared following a required modification. For example, a required modification may include at least one of additional geospatial or time period restrictions. Alternatively, the mission plan 310 may be delayed pending further review by the ATC 108. Alternatively, the mission plan 310 may be rejected or denied.

In another embodiment, a nonce or mission key 314 may be transmitted to the UAV 102 in response to a cleared mission plan 310. The nonce/mission key 314 may be equivalent to, and interchangeable with, the transponder key 162 of FIG. 1A. For instance, a mission key 314 may be at least one of a simple squawk type code or an alphanumeric code based on the ASCII character set. For example, the alphanumeric may provide lookup registration clearances and restrictions for direct UAV 102 control, limitations or boundary definitions. In another embodiment, the mission key 314 may include at least one of an operating area 106, at least one restricted area, or a combination of operating and restricted areas. For instance, an operating area 106 or a restricted area may be defined as an affine, a versor, a rotation group, a set of basis vectors, a set of Euler angles, a vector space, or a similar geometric representation of an area based on a coordinate system. In another embodiment, the mission key 314 may be read-back in a transmission 316 to the ATC 108. In another embodiment, the ATC 108 may clear the read back transmission 316 in a clearing process 318.

In another embodiment, the ATC 108 may transmit a mission file 320 to the UAV 102. The mission file 320 may be equivalent to, and interchangeable with, the transponder key 162 of FIG. 1A. For instance, the mission file 320 may unlock a restricted or prohibited operating area 106 in response to the cleared mission plan 310, including for at least one of a set period of time (164a) or a set flight path (164b). Additionally, the mission file 320 may enable autonomous, semi-autonomous, operator controlled, operator monitored, or line of sight UAV operation. Additionally, the mission file 320 may unlock or alter at least one onboard UAV process (e.g., a software process executing on the processors 122) or access to a UAV hardware component, For instance, the mission file 320 may manipulate at least one flight control 116, unlock the onboard autopilot, enable the onboard transponder 114, effect position reporting, and initiate traffic right-of way protocols. For example, the traffic right-of-way protocols may be based on at least one of safe operation; comity between area UAVs 102; rank or hierarchy of rank; and monetization systems (e.g., a negotiated system allowing a UAV 102 associated with a high bidder to operate exclusively within one or more operating areas 106), as discussed in further detail herein.

In another embodiment, the mission file 320 may unlock the UAV 102 to perform the cleared mission plan 310. For instance, the mission file 320 may include an operating area 106, including at least one of a name and a definition. For example, the operating area definition may include a four digit alphanumeric which includes a first and a second digit representing a position; a third digit representing a time period; and a fourth digit representing at least one of a dimension, a pair of dimensions, an affine type, or a size. An addressing schema as described in accordance with U.S. Pat. No. 5,030,948 may be modified and purposed in any number of useful embodiments to describe an operating area 106, operating mission, operating flight path, or the like, including mission UAV subassembly (camera, sensor, weapon group, or the like) control. By way of another example, the operating area 106a definition may include a lookup register address.

Further, the mission file 320 may restrict or prohibit the UAV 102 from entering at least one additional operating area 106, described in further detail herein.

Further, the mission file 320 may include specific mission directives for commanding flight surfaces and auxiliary systems. For example, the directives may implement real-time maneuver control. By way of another example, the directives may include batch maneuver controls.

It is noted herein that the above examples regarding the transmission of information in the mission file 320 are not limiting and should be interpreted as merely illustrative of the information that may be transmitted within the context of the present invention. For instance, information may be transmitted directly with the mission file 320. Alternatively, information may be pre-loaded onto the UAV 102 (e.g., in memory units 124), and the mission file 320 may transmit a code unlocking the mission information. For example, restricted or prohibited areas may require a special mission file or additional mission file. In another embodiment, the UAV 102 implements the mission file 320 to execute a specific mission process 322.

In another embodiment, the ATC 108 may initiate at least a second communication with the UAV 102. For instance, the ATC 108 may request an update of mission status 324 concerning the progress of the executed mission. In another embodiment, the UAV 102 may transmit, in response to the request 324, a squawk code 326 containing at least one of the position of the UAV 102, VFRs, distress codes, friend versus foe verification codes, formation details, or special access requests associated with additional operating areas 106.

In another embodiment, the ATC 108 may store the transmitted squawk code 326 with a recording process 328 and monitor the progress of the UAV 102. For instance, the ATC 108 may monitor the progress of the UAV 102 through standard aircraft monitoring and control systems, including at least one of radar, TAS, TCAS, and ADS-B. In another embodiment, the ATC 108 and the UAV 102 may continue the cycle of requesting and transmitting information for the duration of the UAV mission.

In another embodiment, the ATC 108 may transmit additional or subsequent mission files 320a or transponder keys to the UAV 102. In another embodiment, the additional mission files 320a may be transmitted in response to at least one event 330 occurring along the mission path of the previously-transmitted mission file 320. For instance, the event 330 may be a change to the classification of the operating area 106 allowed in the previously-transmitted mission file 320. Additionally, the event 330 may be another aircraft's previously-transmitted mission file. In another embodiment, the additional mission files 320a may include a scram order in response to a change in the classification of an operating area 106. For example, the scram order may include at least one of a "return to base" command, a cease "operation in a defined geospatial area" command, a "mission cancel" command, or a "cancel/ground" command similar to a kill switch.

In another embodiment, the additional mission files 320a may be UAV 102-specific. Alternatively, the additional mission files 320a may be sent to a class of UAV 102 within an operating area 106 or other defined area. Alternatively, the additional mission files 320a may be sent to all UAV 102 within an area.

In another embodiment, the ATC 108 may initiate the additional mission files 320a with additional area UAVs 102 with whom the ATC 108 has had no prior communication.

In another embodiment, in the case of a class of, or all, area UAVs 102 receiving additional mission files 320a issuing a scram order, the use of a UAV squawk position and other information in an ADS-B or ADS-B-like environment to negotiate avoidance with other aircraft (manned or unmanned) may be preferred. For instance, negotiating avoidance may implement a hierarchy of avoidance protocols. One or more UAVs 102, or a class of UAVs, or all UAVs, may be configured to periodically transmit (e.g., as ADS-B Out messages via the onboard transponder 114) identification and position information to the ATC 108 or to any proximate aircraft, manned or unmanned, capable of receiving the information.

It is noted herein that submitting the flight plan request 310 and receiving the mission key 314 may be a two-step process if, for example, the operating area 106 is entirely unrestricted. It is further noted herein that submitting the flight plan request 310 may remove or add to the processes listed above as necessary. As such, the examples provided above should not be interpreted at limiting and are provided merely as illustration.

Figure 4A:
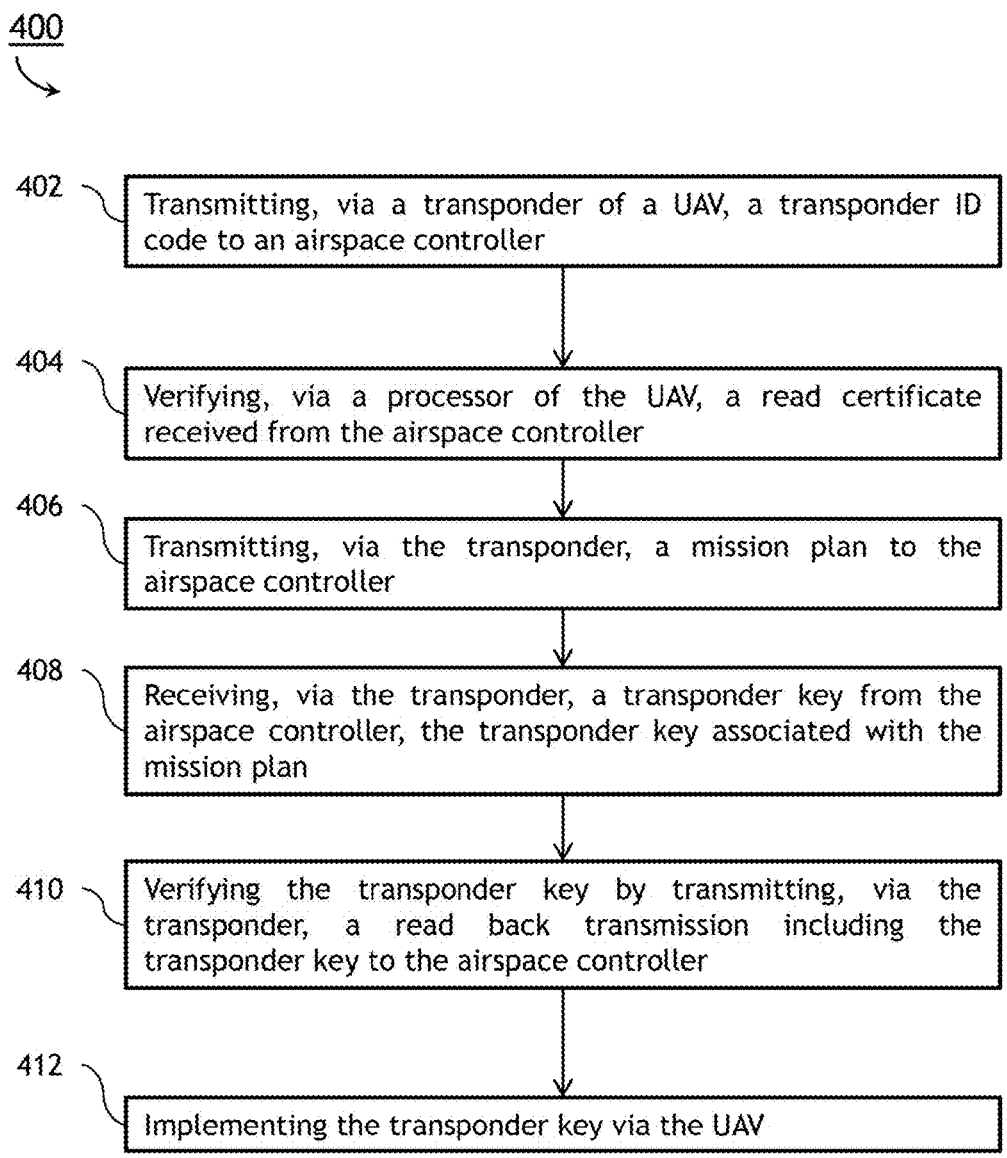
FIGS. 4A through 4C illustrate an exemplary embodiment of a method for controlling an unmanned aerial vehicle (UAV) according to the inventive concepts disclosed herein.
Figure 4B:
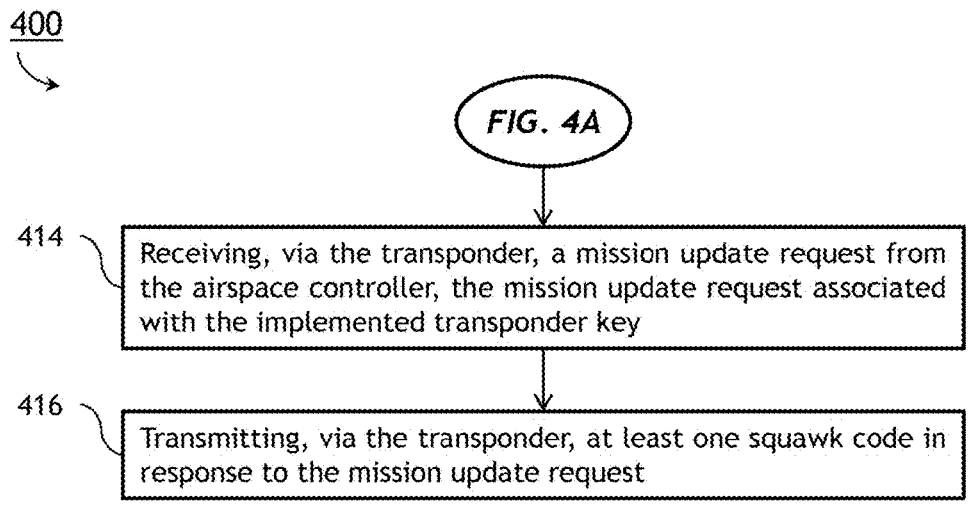
Figure 4C:
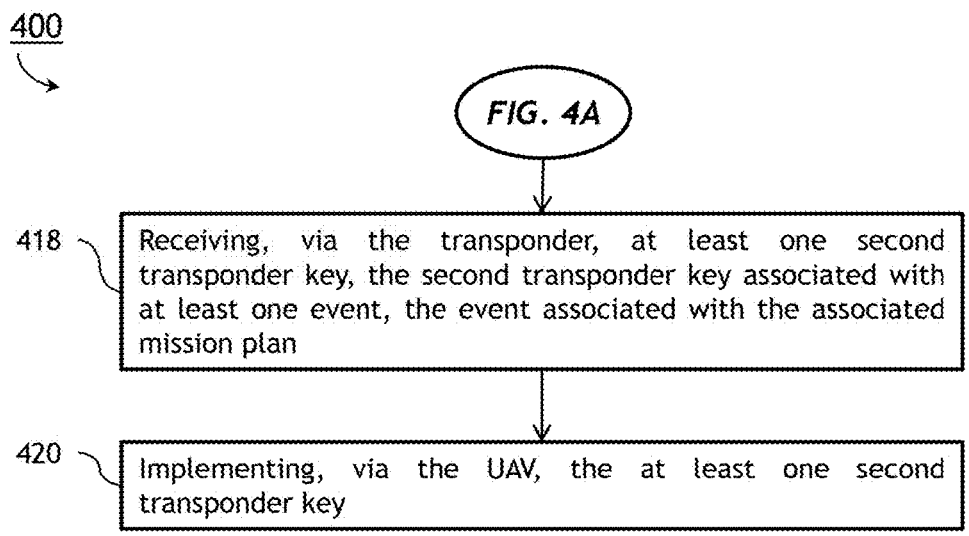

Referring to FIGS. 4A through 4C, an exemplary embodiment of a method 400 for controlling an unmanned aerial vehicle (UAV) may be implemented by the system 100 of FIG. 1A and may include the following steps. At a step 402, the UAV transmits, via an onboard transponder, a transponder ID code to an airspace controller for verification.

At a step 404, the UAV verifies a read certificate received from the airspace controller in response to an authenticated transponder ID code. The read certificate may be transmitted by the airspace controller contingent on authentication by the airspace controller of the transponder ID code.

At a step 406, the UAV transmits, via the transponder, a mission plan, or flight plan request, to the airspace controller.

At a step 408, the UAV receives, via the transponder, a transponder key, or mission file associated with the transmitted mission plan, from the airspace controller. The transponder key or mission file may include modifications to the transmitted mission plan.

At a step 410, the UAV verifies the received transponder key by transmitting, via the transponder, a read-back transmission including the transponder key to the airspace controller.

At a step 412, the UAV implements the verified transponder key (or associated mission plan). For example, the UAV may be granted access to a restricted or prohibited area for a predetermined time period or according to a predetermined flight path. In the alternative, implementing the mission plan may restrict or bar the UAV from other operating areas. The transponder key may unlock software processes executing on the processors of the UAV, mission information stored in the memory of the UAV, or hardware components of the UAV (e.g., an autopilot system or means for the airspace controller to remotely operate or maneuver the UAV.

Referring to FIG. 4B, the method 400 may include additional steps 414 and 416. At the step 414, the UAV receives, via the transponder, a mission update request associated with the implemented transponder key (or mission plan) from the airspace controller. At the step 416, the UAV responds to the mission update request by transmitting (via the transponder) a squawk code. The squawk code may include a position of the UAV, a VFR request, an access request associated with one or more additional operating areas, a distress code, a verification code, or a formation detail associated with the currently implemented mission plan.

Referring to FIG. 4C, the method 400 may include additional steps 418 and 420. At the step 418, the UAV receives, via the transponder, a second transponder key associated with an event of the associated (currently implemented) mission plan. At the step 420, the UAV implements the second transponder key.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system for controlling an unmanned aerial vehicle (UAV), comprising:
   at least one UAV including:
      a UAV chassis including an airframe, one or more rotors, one or more motors coupled to the one or more rotors and configured to articulate the one or more rotors at one or more rotor speeds, the one or more motors driven by one or more power sources;
      an operation module including one or more processors, one or more memory units coupled to the one or more processors, one or more flight controls, and a clock;
      a position module including a global navigation satellite system (GNSS) receiver and a transponder coupled to the GNSS receiver;
   at least one operating area defined by at least one boundary within an airspace; and
   an airspace controller;
   wherein the UAV is configured to execute, via the transponder, at least one communication with the airspace controller, the at least one communication including:
      transmitting an identification (ID) code of the transponder to the airspace controller for verification;
      receiving a read certificate from the airspace controller;
      transmitting a mission plan to the airspace controller;
      receiving a first transponder key from the airspace controller, the transponder key corresponding to the transmitted mission plan;
      verifying the received first transponder key by transmitting a read back transmission including the received first transponder key to the airspace controller; and
      implementing the received first transponder key.

2. The system of claim 1, wherein the transponder includes at least one ADS-B compatible antenna and is configured to:
   transmit and receive at least one message having an ADS-B compatible format at a frequency of 978 MHz or 1090 MHz; and
   transmit the at least one message as an ADS-B Out message including at least one of a position of the UAV, a unique identifier of the UAV, and a status of the UAV.

3. The system of claim 1, wherein the transponder ID code is an alphanumeric code including a unique identifier of the UAV.

4. The system of claim 1, wherein the mission plan includes one or more of a unique identifier of the UAV, operator information associated with an operator of the UAV, a proposed operating area, a proposed mission purpose, a proposed mission start time, and a proposed mission end time.

5. The system of claim 1, wherein the first transponder key includes at least one descriptor associated with one or more of an operating area of the mission plan, an operating mission of the mission plan, and an operating flight path of the mission plan, the descriptor including at least one of:
   an alphanumeric code, a lookup register address, an affine, a versor, a rotation group, a set of basis vectors, a set of Euler angles, a vector space, a geometric representation, a coordinate representation, an unrestricted classification, a restricted classification, a prohibited classification, and a modification to the mission plan.

6. The system of claim 1, wherein the first transponder key is configured to unlock or alter at least one of a hardware component of the UAV and a software process executing on the one or more processors.

7. The system of claim 6, wherein at least one block of the one or more memory units contains preloaded mission information unlockable by the first transponder key.

8. The system of claim 6, wherein the first transponder key includes at least one mission directive associated with autonomous or semi-autonomous control of at least one of the hardware component and the software process.

9. The system of claim 1, wherein the UAV is configured to receive, via the transponder, at least one second transponder key from the airspace controller, the at least one second transponder key associated with at least one event of the mission plan.

10. The system of claim 9, wherein the second transponder key includes at least one of a change in the classification of an operating area of the mission plan, a scram order associated with the change, and a mission update request.

11. The system of claim 10, wherein the UAV is configured to transmit at least one squawk code in response to the mission update request, the squawk code including at least one of a position of the UAV, a VFR request, an access request associated with an additional operating area, a distress code, a verification code, and a formation detail.

12. The system of claim 10, wherein the scram order includes at least one of a return to base command, a cease operations command associated with a defined geospatial area, a mission cancel command, and a cancel-and-ground command.

13. An unmanned aerial vehicle (UAV), comprising:
   a chassis including an airframe, one or more rotors, one or more motors coupled to the one or more rotors and configured to articulate the one or more rotors at one or more rotor speeds, the one or more motors driven by one or more power sources;
   an operation module including one or more processors, one or more memory units coupled to the one or more processors, one or more flight controls, and a clock;
   a global navigation satellite system (GNSS) receiver coupled to the operation module, the GNSS receiver configured to determine a position of the UAV; and
   a transponder coupled to the operation module;
   wherein the UAV is configured to execute, via the transponder, at least one communication with a controller of the airspace, the at least one communication including:
      transmitting an identification (ID) code of the transponder to the airspace controller for verification;
      receiving a read certificate from the airspace controller;
      transmitting a mission plan to the airspace controller;
      receiving a first transponder key from the airspace controller, the transponder key corresponding to the transmitted mission plan;
      verifying the received first transponder key by transmitting a read back transmission including the received first transponder key to the airspace controller; and
      implementing the received first transponder key.

14. A method for controlling an unmanned aerial vehicle (UAV), comprising:
   transmitting, via a transponder of a UAV, a transponder identification (ID) code to an airspace controller;
   verifying, via a processor of the UAV, a read certificate received from the airspace controller;

transmitting, via the transponder, a mission plan to the airspace controller;

receiving, via the transponder, a transponder key from the airspace controller, the transponder key associated with the mission plan;

verifying the transponder key by transmitting, via the transponder, a read back transmission to the airspace controller, the read back transmission including the transponder key; and implementing the transponder key via the UAV.

15. The method of claim 14, wherein verifying, via a processor of the UAV, a read certificate received from the airspace controller includes: receiving a read certificate from the airspace controller contingent on authentication of the transmitted transponder ID code by the airspace controller.

16. The method of claim 14, wherein receiving, via the transponder, a transponder key from the airspace controller, the transponder key associated with the mission plan includes:

receiving, via the transponder, a transponder key from the airspace controller, the transponder key associated with a transmitted mission plan approved by the airspace controller.

17. The method of claim 14, wherein implementing the transponder key via the UAV includes at least one of:

implementing the associated mission plan;

gaining access to at least one of a first restricted operating area and a first prohibited operating area for a predetermined time period;

gaining access to at least one of the first restricted operating area and the first prohibited operating area along at least one predetermined flight path;

unlocking at least one of a software process executing on the processor, mission information stored in a memory of the UAV, and a hardware component of the UAV; and restricting access of the UAV to at least one second operating area.

18. The method of claim 14, further comprising:

receiving, via the transponder, a mission update request from the airspace controller, the mission update request associated with the implemented transponder key; and transmitting, via the transponder, at least one squawk code in response to the mission update request.

19. The method of claim 18, wherein transmitting, via the transponder, at least one squawk code in response to the mission update request includes:

transmitting, via the transponder, at least one of a position of the UAV, a VFR request, an access request associated with a third operating area, a distress code, a verification code, and a formation detail.

20. The method of claim 14, further comprising:

receiving, via the transponder, at least one second transponder key, the second transponder key associated with at least one event, the event associated with the associated mission plan; and implementing, via the UAV, the at least one second transponder key.

* * * * *